UNITED STATES PATENT OFFICE.

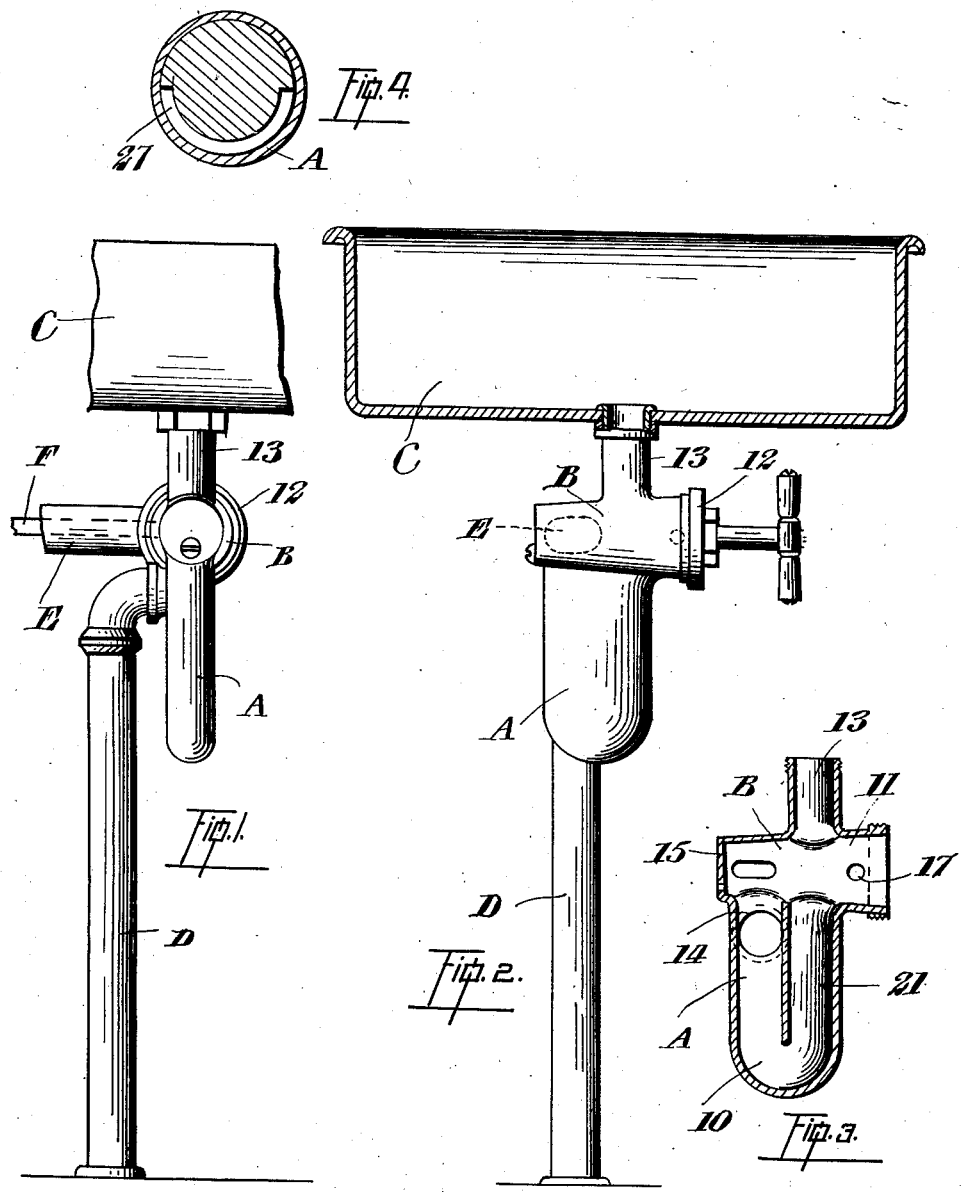

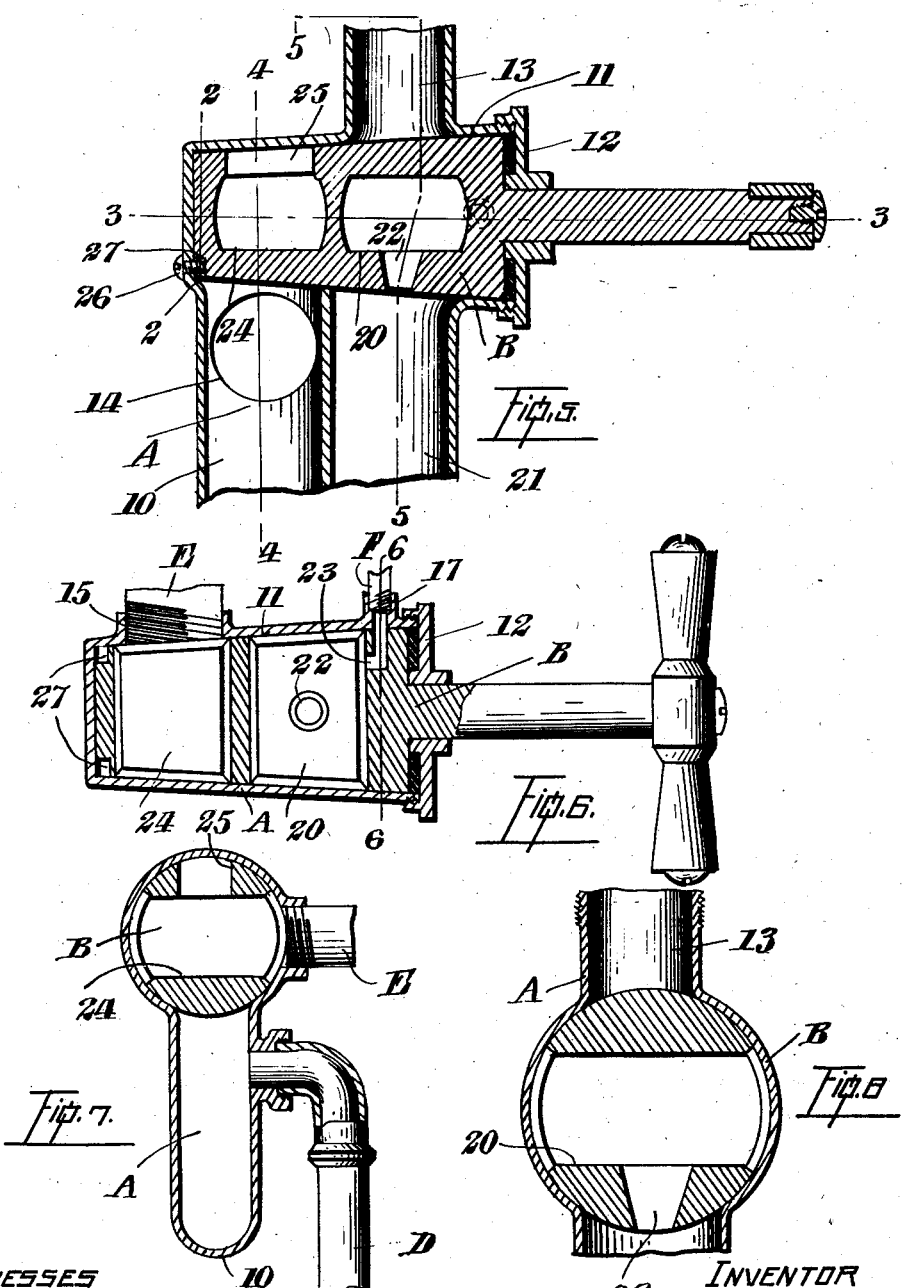

CHARLES HOPEWELL, OF OTTAWA, ONTARIO, CANADA.

FLUSHING DEVICE.

1,079,555.  Specification of Letters Patent.  Patented Nov. 25, 1913.

Application filed April 8, 1913. Serial No. 759,626.

*To all whom it may concern:*

Be it known that I, CHARLES HOPEWELL, a subject of the King of Great Britain, and resident of Ottawa, in the Province of Ontario, in the Dominion of Canada, have invented certain new and useful Improvements in Flushing Devices, of which the following is the specification.

This invention relates to a combination sanitary trap and waste flush and the objects of the invention are to provide a simple and effective device by means of which waste traps and pipes may be effectively cleaned, and by which, further, when the water is shut off any return of sewer or other gas into the building in which the plumbing fixture is located may be prevented, and which also will remove any blockage in main pipes.

A further object is to combine the flushing device with a trap that may be manufactured at low cost and occupy practically no more additional space beneath the fixture than an ordinary trap.

A further object still is to provide means for controlling the vent from the trap simultaneously with the flushing device and waste pipe.

The invention consists essentially of the improved construction and arrangement of parts hereinafter described in detail in the accompanying specification and drawings.

In the drawings, Figure 1 is a side elevation of an embodiment of the invention. Fig. 2 is a front elevation thereof. Fig. 3 is a cross section through the casing of the trap. Fig. 4 is a sectional detail on the line 2—2, Fig. 5. Fig. 5 is a longitudinal vertical section through the valve member. Fig. 6 is a horizontal section on the line 3—3, Fig. 5. Fig. 7 is a section on the line 4—4, Fig. 5. Fig. 8 is a section on the line 5—5, Fig. 5.

In the drawings like characters of reference indicate corresponding parts in all the figures.

In the preferred embodiment of the invention the flushing and vent controlling means are incorporated in the trap. It will be apparent that if desired they might be manufactured separate from the trap and connected thereto in the ordinary manner.

Referring to the drawings, A represents a casing which serves both as a trap and casing for the valve member B. The trap is of the usual water sealed variety, including a channel having a U-shaped bend 10 in which a water seal is normally maintained. The casing is formed with a valve seat 11 extending transversely across the upper end of the U-shaped bend and on which the valve member B, conveniently in the form of a plug valve, is mounted, the plug valve being slightly conical in shape and being retained on its seat by means of the cap 12. A tubular neck 13 is provided above the valve seat and to which the sink C or wash basin or other fixture to which the device is applied, is connected. The waste pipe D leads from an opening 14 at the end of the U-shaped bend 10. The back vent or ventilating pipe E for the trap leads from an opening 15 in the casing A and at the side of the valve seat 11 near one end of the same. The inlet pipe F for flushing water connects with an opening 17 in the casing near that end of the valve seat remote from the opening 15.

The plug valve B is formed with a series of ports, which may be readily understood by reference to Figs. 5 to 8 of the drawings. 20 represents a transverse port adapted in one position to afford communication between the neck 13 and the arm 21 of the U-shaped bend. This port 20 is formed in the side with a flushing port 22 which, when the plug is in the position shown in Fig. 5, permits the flushing water to be discharged downwardly into the U-shaped bend or trap. The side of the port 22 also communicates with a relatively small flushing port 23 adapted in the position shown in Fig. 5 to register with the opening 17 for the flushing water, which would be under pressure so that when the plug valve is in the position shown in Fig. 5 the flushing water may discharge through the trap and through the opening 14 to the waste pipe D. If waste pipe D is blocked, the flushing water cannot back up into either fixture, or the back vent, as both are closed by the valve while in this position. 24 represents a port parallel with the port 20 but longitudinally spaced therefrom and which communicates with a side port 25, the said ports 24 and 25 being adapted in one position of the plug valve to afford connection between the U-shaped bend and the opening 15 thereby placing the waste pipe and trap in communication with the back vent. The movement of the plug valve is adapted to be limited in either direction by suitable means such as the screw 26 extending through the end of the casing into a peripheral groove 27 formed in the end of the plug valve, there being three distinct positions of the plug valve, one in which the pin is in the center of the groove and the other two when the pin is at opposite ends of the groove.

The operation of the invention may be understood from the following description:—There are three distinct positions of the plug valve, two of which are separated from the center position by a quarter turn. In the position shown in Fig. 5, the inlet neck 13 from the fixture is closed. The connection between the back vent and the trap is closed and the passage for the flushing water through the opening 17, ports 23, 20 and 22 to the U-shaped bend 10 is clear, from which bend the flushing water passes to the waste pipe and in doing so effectively cleans the trap and pipe. The plug valve will in this position be turned to the extreme left. If desired to insure thorough cleansing of the trap and waste pipe a piece of paper or waste may be forced through the trap and pipe by the pressure of the flushing water while the device is in this position. If the plug valve be turned to middle position, then the waste material may pass from the fixture through the main 17 and port 20 to the U-shaped bend and out the waste pipe D. At the same time the ports 24 and 25 will afford communication between the trap, waste pipe and the vent pipe E. If the plug valve is turned another quarter of a revolution to the right, the ports 24 and 25 will still maintain the connection between the waste and the back vent but the connection between the trap and the fixture will be cut off by the plug valve so that no odor may arise from the trap to the fixture and thence to the room. As the normal position cuts off the outlet from the fixture it is possible to dispense with the usual waste plug in the fixture.

It will be seen that the device provides means by which not only may the trap be cleaned by the flushing action of the full waterworks pressure, but the connection between the waste pipe and the fixture may be cut off when the fixture is not in use, and further, the back vent may be kept open even although the connection between the fixture and the waste pipe be cut off.

As many changes could be made in the above construction and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

What I claim as my invention is:

1. In a device of the class described, and in combination, a casing having an inlet adapted to be connected to a plumbing fixture, a waste outlet, a passage from the inlet to outlet, a ventilating outlet, a flushing water inlet and a valve seat, and a single valve member on the seat controlling the ventilating outlet, the flushing water inlet and the passage of material through the passageway.

2. In a device of the character described and in combination, a waste pipe, adapted to lead to a drain, a ventilating pipe and a flushing pipe, a casing uniting said pipes, and single valve means in the casing controlling all the said pipes adapted in one position to open the waste and ventilating pipes and close the flushing pipe and in another position to close the waste and ventilating pipes and open the flushing pipe on the drainward side of the closure in the waste pipe, and adapted in a third position to close the waste pipe but leave the waste pipe on the drainward side of the closure in communication with the ventilating pipe.

3. A device of the character described comprising a valve casing having a main inlet, a flushing inlet, a waste-pipe outlet and a ventilating outlet and turning plug in the casing having separated parallel ports therethrough with lateral ports affording communication in certain positions between the inlets and outlets aforesaid.

4. A device of the character described comprising a valve casing having a main inlet, a flushing inlet, a waste-pipe outlet and a ventilating outlet, and a turning plug having separated parallel ports therethrough, one of said ports communicating with a side port, which ports are adapted in a certain position to afford communication between the waste and the ventilating outlet and the other port communicating with a lateral passageway and a lateral port adapted in a certain position to afford communication between the waste and the flushing inlet.

In witness whereof I have hereunto set my hand in the presence of two witnesses.

CHARLES HOPEWELL.

Witnesses:
RUSSEL S. SMART,
PEARLE M. GARROW.